(12) United States Patent
Gramling et al.

(10) Patent No.: US 9,144,191 B1
(45) Date of Patent: Sep. 29, 2015

(54) ANHYDROUS AMMONIA METERING MANIFOLD WITH VARIABLE ORIFICE DISTRIBUTION ASSEMBLY

(71) Applicants: David J. Gramling, LeCenter, MN (US); Paul L Ardison, St. Peter, MN (US)

(72) Inventors: David J. Gramling, LeCenter, MN (US); Paul L Ardison, St. Peter, MN (US)

(*) Notice: Subject to any disclaimer, the term of this patent is extended or adjusted under 35 U.S.C. 154(b) by 205 days.

(21) Appl. No.: 14/019,390

(22) Filed: Sep. 5, 2013

(51) Int. Cl.
*A01C 23/00* (2006.01)
*A01C 23/02* (2006.01)
*A01C 21/00* (2006.01)

(52) U.S. Cl.
CPC ............ *A01C 23/024* (2013.01); *A01C 21/002* (2013.01)

(58) Field of Classification Search
USPC .......... 111/118–120, 123, 129, 200; 239/548, 239/589, 601, 562, 568, DIG. 12
See application file for complete search history.

(56) References Cited

U.S. PATENT DOCUMENTS

| 2,973,728 | A | * | 3/1961 | Garretson | ...................... 111/119 |
| 4,807,663 | A | * | 2/1989 | Jones | ......................... 137/561 A |
| 5,170,820 | A | * | 12/1992 | Jones | ............................. 137/899 |

* cited by examiner

*Primary Examiner* — Alicia Torres
(74) *Attorney, Agent, or Firm* — Robert L. Farris; Farris Law, P.C.

(57) ABSTRACT

A fertilizer system includes a supply vessel pressurized by anhydrous ammonia vapor. The fertilizer passes through a heat exchanger. Cooled fertilizer passes through a flow meter, an on/off valve and to a variable orifice distribution assembly body. A cage with axially elongated cage slots is press fit in a body bore with each slot aligned with an outlet port. Each port is connected to a soil knife by a conduit line. A piston with axially elongated piston slots is axially slidable in the cage. Each piston slot is moved axially in the cage to cooperate with a cage slot. An actuator moves the piston to a position that blocks flow through the piston slots and positions in which fertilizer flows through each piston slot and portions of each cage slot in communication with a piston slot. Vapor pressure in the supply vessel moves fertilizer to the knife opener.

6 Claims, 11 Drawing Sheets

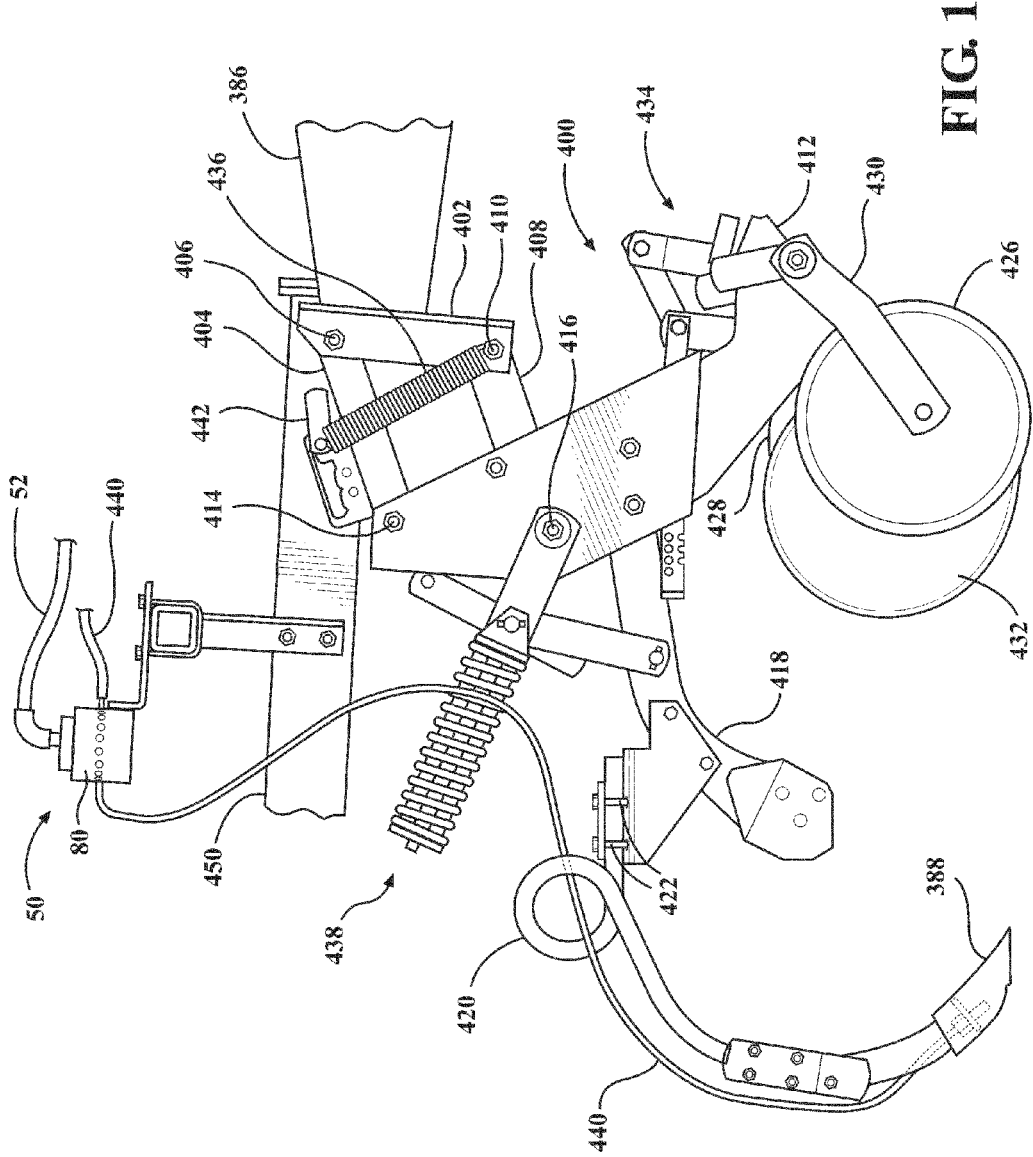

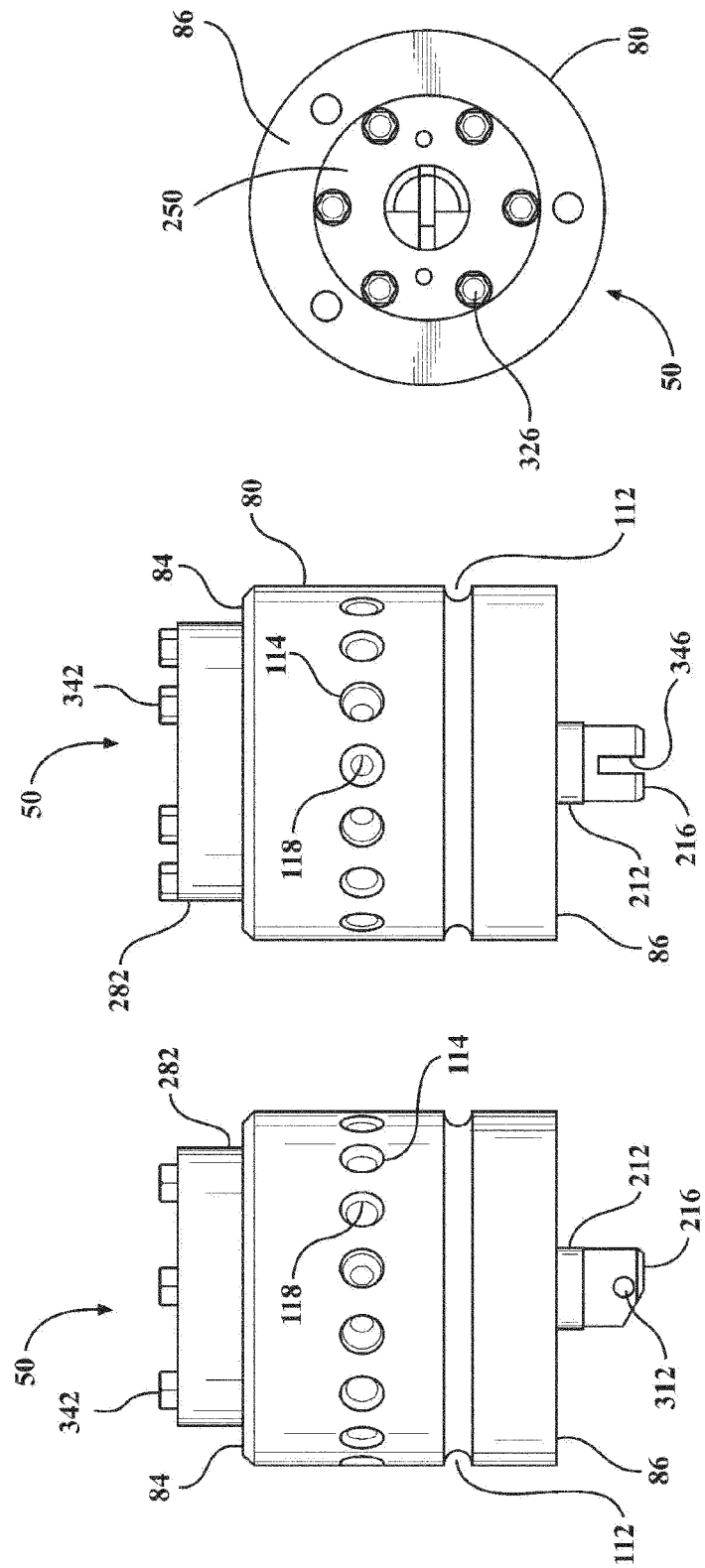

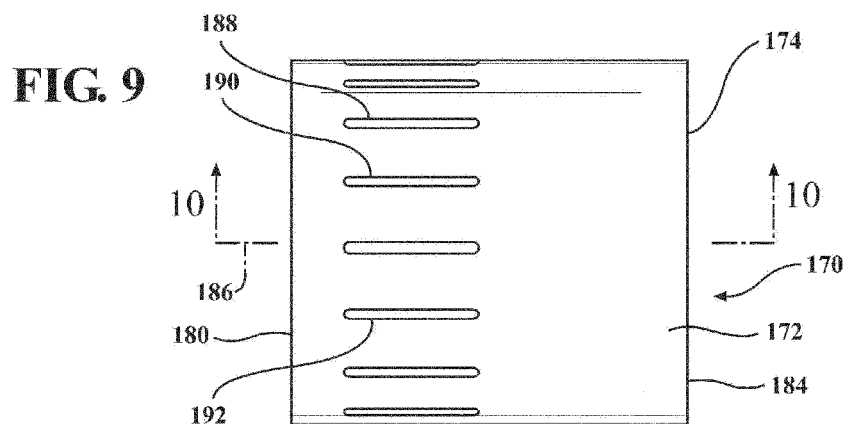
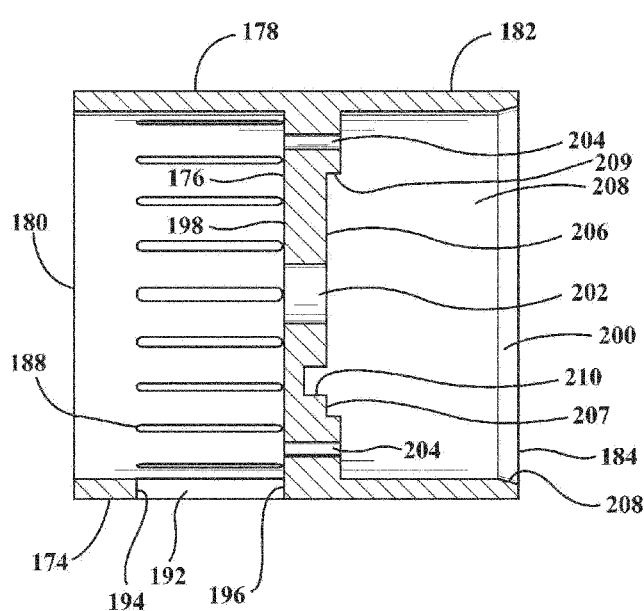
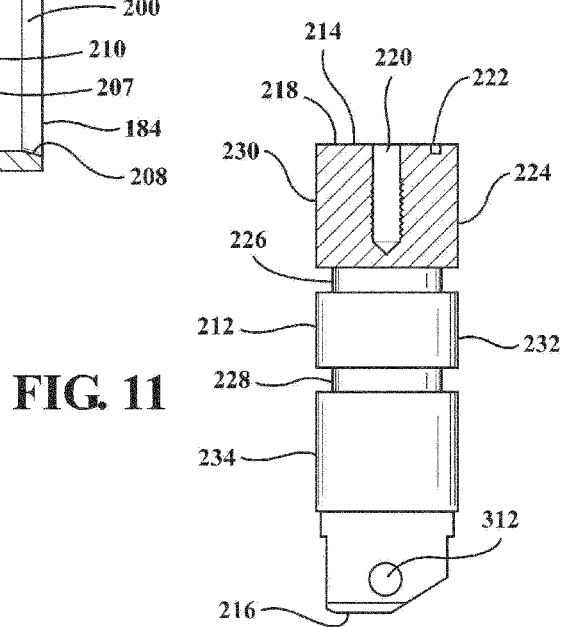
FIG. 9
FIG. 10
FIG. 11

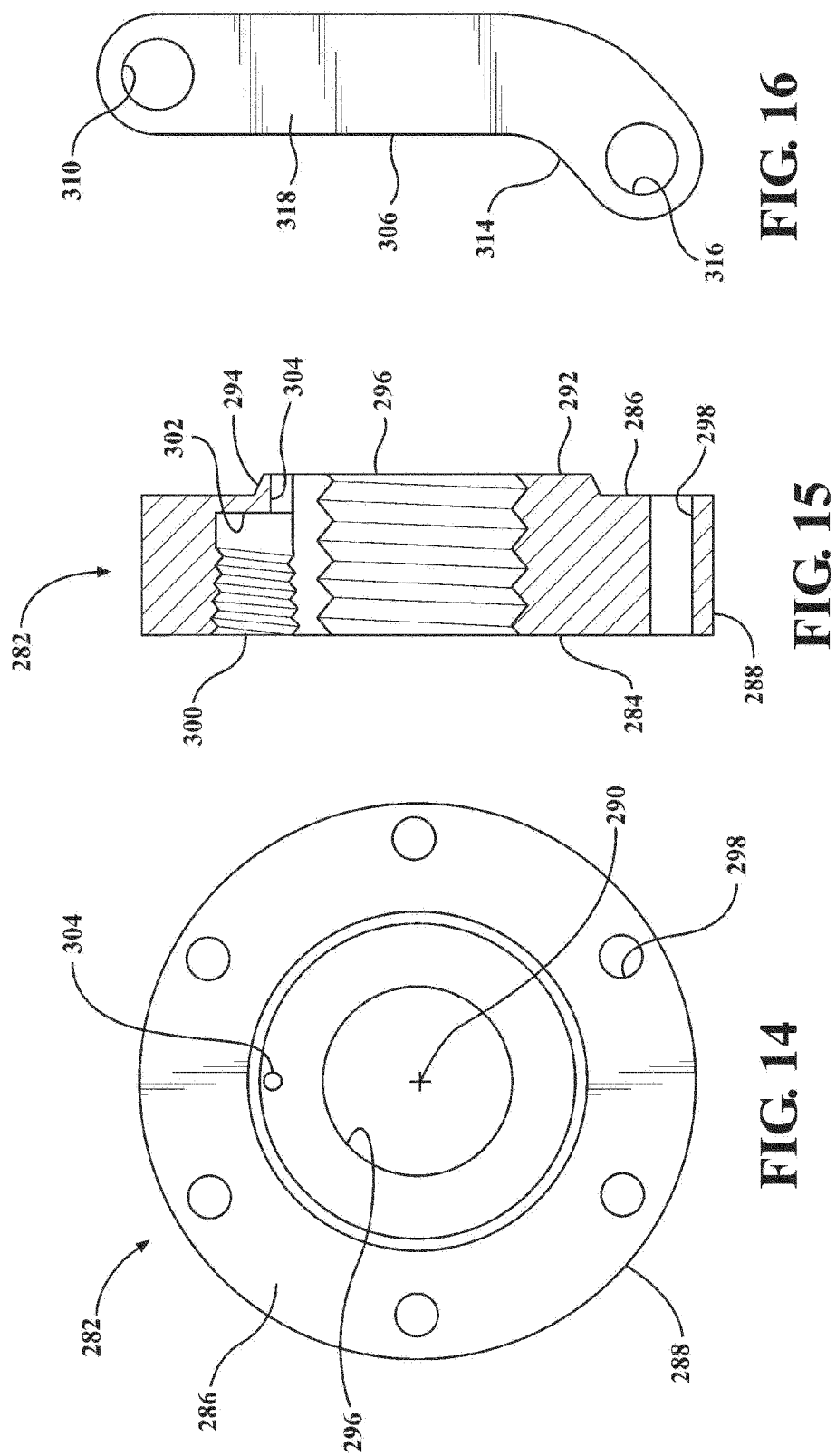

ANHYDROUS AMMONIA METERING MANIFOLD WITH VARIABLE ORIFICE DISTRIBUTION ASSEMBLY

TECHNICAL FIELD

The invention is an anhydrous ammonia fertilizer applicator apparatus and method that includes a combined flow divider and metering assembly and eliminates a flow metering apparatus between an anhydrous ammonia supply tank and a manifold.

BACKGROUND OF THE INVENTION

Growing plants need nitrogen. Plants such as maize (Indian corn) require a substantial quantity of nitrogen. The soil corn plants grow in obtain nitrogen from legumes such as soybeans, from snow and from other sources. Excess nitrogen will reduce yield of crops such as corn. Insufficient nitrogen will also reduce crop yield. Water used to irrigate plants generally contains minimal nitrogen.

Anhydrous ammonia has been used for many years to provide nitrogen. The anhydrous ammonia is injected into the ground as a liquid or vapor. Injection of anhydrous ammonia into soil is subject to a number of problems. Determining the quantity of nitrogen to be added is complicated by the fact that a substantial quantity of nitrogen may be stored in the soil. Soil samples are required to determine the status of stored nitrogen that is available. The soil samples often indicate that the distribution of stored nitrogen varies from one location to another in each farm field.

The cost of anhydrous ammonia has increased overtime due in part to the increased use by farmers around the planet. Farmers have in the past applied anhydrous ammonia and other fertilizers to maximize crop yield. Farmers are forced today to consider the costs and reduce the use of anhydrous ammonia and other fertilizers, when the cost of additional fertilizers exceeds the value of a minimal increase in crop production.

The loss of anhydrous ammonia needs to be limited to the extent possible. The over application in some areas of each field also needs to be limited or even eliminated.

The change in some anhydrous ammonia from a liquid to a vapor makes accurate control of the application rate difficult. Vapor separated from the liquid results in the over application rate in some areas. The separation of vapor may also result in the loss of some anhydrous ammonia.

Increased pressure in an anhydrous ammonia application system can keep the pressure of the liquid above the vapor pressure of the liquid at ambient temperature. However, a pump in the supply system between a nurse tank and liquid discharge nozzle will create a pressure drop on the pump inlet side. This pressure drop will at times produce vapor. The anhydrous ammonia vapor will prevent accurate metering of a liquid and vapor mixture. Separation of the vapor generally results in a loss of some anhydrous ammonia.

Reducing the temperature in an anhydrous ammonia application system can keep the temperature of the liquid below the temperature at which vapor could be formed. Temperature lowering is obtained by bleeding off some liquid, expanding the liquid into a cold vapor and passing the cold vapor through a heat exchanger. Anhydrous ammonia liquid passing through the heat exchanger is cooled. The vapor discharged from the heat exchanger is then injected into the ground. The vapor is not completely lost. However, some anhydrous ammonia vapor is added to one of several plant rows that also has a metered quantity of liquid anhydrous ammonia. The additional anhydrous ammonia from vapor may provide excess nitrogen to one crop row and may reduce crop yield in that crop row.

Anhydrous ammonia application systems with or without pumps as well as systems with or without cooling systems often include a flow sensor that measures the total flow rate. These systems include a servo valve that controls the total flow rate. A manifold divides the flow of anhydrous ammonia to soil cutting knives. The servo valve reduces the pressure of discharged anhydrous ammonia and may create some vapor. Vapor mixed with liquid anhydrous ammonia will result in an unequal flow from a manifold down stream from a servo valve or other flow control device.

SUMMARY OF THE INVENTION

The anhydrous ammonia fertilizer distribution system includes a pressurized supply vessel, a heat exchanger mounted on a tool bar and a supply line connected to the pressurized supply vessel and the heat exchanger. A variable orifice distributor assembly, mounted on the tool bar, is connected to the heat exchanger by a continuing supply line. The vapor pressure of anhydrous ammonia in the pressurized supply vessel forces anhydrous ammonia through the distribution system. The heat exchanger cools the anhydrous ammonia to limit anhydrous ammonia vapors in the liquid. An on and off valve and a flow meter may be provided in the continuing supply line. A plurality of knives for opening slots in the ground are mounted on the tool bar. A plurality of fertilizer lines are each connected to one of the plurality of knives and to the variable orifice distribution assembly.

The variable orifice distribution assembly includes a body. The body has a central bore with a central axis, an inlet end and a control end. The central bore includes a small diameter bore coaxial with the central axis. A medium diameter bore is coaxial with the central axis and extends from the inlet end to the small diameter bore. A large diameter bore is coaxial with the central axis and extends from the control end to the small diameter bore. A small ring shaped surface is perpendicular to the central axis and extends radially from the small diameter bore to the medium diameter bore. A large ring shaped surface is perpendicular to the central axis and extends radially from the small diameter bore to the large diameter bore. A plurality of discharge ports each of which extend radially outward from the medium diameter bore to one of a plurality of discharge ports. Each of the plurality of discharge ports is connected to one of the plurality of fertilizer lines and one of the plurality of knives.

A fixed distribution cage has a cage cylindrical inside surface, a cage cylindrical outside surface, an anchor end and a free end. A plurality of axially elongated cage slots pass radially through the fixed distribution cage. The fixed distribution cage is press fit in the medium diameter bore. The anchor end of the fixed distribution engages the small ring shaped surface. Each of the plurality of axially elongated cage slots is aligned with one of the plurality of discharge ports. A seal is formed between the cylindrical outside surface of the fixed distribution cage and the medium diameter bore.

A piston head includes a cylindrical wall with a radially outer surface and a radially inner surface. A transverse plate is integral with the cylindrical wall and divides the cylindrical wall into a head end skirt with a head end and a rod end skirt with a skirt rod end concentric with a piston head axis. A plurality of axially elongated piston slots are parallel with the piston head axis. Each of the plurality of axially elongated piston slots pass radially through the head end skirt between the transverse plate and the head end of the head end skirt. At least one bore through the transverse plate provides equal fluid pressure on the piston head.

A piston shaft has a piston end. The piston end is connected to the transverse plate in the rod end skirt. The piston shaft also has a driven end. A cylindrical bearing surface of the piston shaft is between the piston end and the driven end. A first sealing ring groove in the cylindrical bearing surface and a second sealing ring groove in the cylindrical bearing surface divide the cylindrical bearing surface into a piston end bearing portion surface, a center portion bearing surface and a control end bearing portion surface. A head end resilient low friction seal is mounted in the first sealing ring groove. A control end resilient low friction seal is mounted in the second sealing ring groove. A connector rod is pivotally connected to the driven end.

A control end insert has a base end received in the large diameter bore and clamped to the large ring shaped surface. A mast first cylindrical portion, of the control end insert, is received in the small diameter bore of the body. A mast second cylindrical portion has an outside diameter that is smaller than the small diameter bore and the radially inner surface of the cylindrical wall of the piston head. A mast ring shaped surface is between the mast first cylindrical portion and the mast second cylindrical portion. A mast end surface faces away from the base end. A mast central bore passes through the control end insert and is coaxial with the central axis of the body.

The piston shaft extends from the transverse plate of the piston head passes through the central bore of the central end insert. The piston shaft holds the head end resilient low friction seal and the control end resilient low friction seal in the mast central bore and in sliding engagement with mast central bore. The piston shaft holds the radially outer surface of the piston head in sliding and sealing engagement with the cage cylindrical inside surface of the fixed distribution cage.

An inlet end cover is clamped to the inlet end of the cylindrical body. An inlet threaded bore in the inlet end cover is connected to the continuing supply line.

An electric actuator is connected to the connector rod through a connecting rod drive assembly. The actuator moves the piston head relative to the fixed distribution cage to a position in which anhydrous ammonia flow through the plurality of axially elongated piston slots is blocked, to a position in which maximum anhydrous ammonia flow through the plurality of axially elongated piston slots and the plurality of axially elongated cage slots occurs. The actuator also moves the piston head relative to the fixed distribution cage to a position which provides a desired flow rate.

Each of the plurality of axially elongated piston slots meters anhydrous ammonia fertilizer into the portion of an adjacent one of the plurality of axially elongated cage slots that is in communication with the axially elongated piston slot.

The plurality of axially elongated piston slots has a piston slot length from a slot head end to a slot rod end that is substantially the same as the cage slot length from a first inside arcuate end to a second inside arcuate end. Each axially elongated piston slot has a piston slot width transverse to a piston head axis from an elongated first wall to an elongated second wall that is less than is a cage slot width transverse to a cage axis from a first straight inside edge to a second inside straight edge. Each of the axially elongated cage slots in the fixed distribution cage increases in size from the cage cylindrical inside surface to the cage cylindrical outside surface.

The transverse plate of the piston head includes a recess that receives a piston engaging surface of the piston shaft.

BRIEF DESCRIPTION OF DRAWINGS

The presently preferred embodiment of the invention is disclosed in the following description and in the following drawings, wherein:

FIG. 1 is a perspective view of an anhydrous ammonia fertilizer knife, row unit and variable orifice distribution assembly, mounted on a tool bar with parts broken away;

FIG. 2 is a side elevational view of the variable orifice distribution assembly;

FIG. 3 is a front elevational view of the variable orifice distribution assembly;

FIG. 4 is a bottom view of the variable orifice distribution assembly;

FIG. 9 is a side elevational view of a piston head of the variable orifice distribution assembly;

FIG. 10 is a sectional view of the piston head taken along line 10-10 in FIG. 9;

FIG. 11 is an enlarged elevational view of a piston shaft with a partial vertical section;

FIG. 14 is an inside view of an inlet end cover of the variable orifice distribution assembly;

FIG. 15 is a sectional view of the inlet end cover, through an inlet end cover axis;

FIG. 16 is an enlarged elevational view of a connector rod of the variable orifice distribution assembly;

DETAILED DESCRIPTION OF THE PREFERRED EMBODIMENTS

Figure 20:
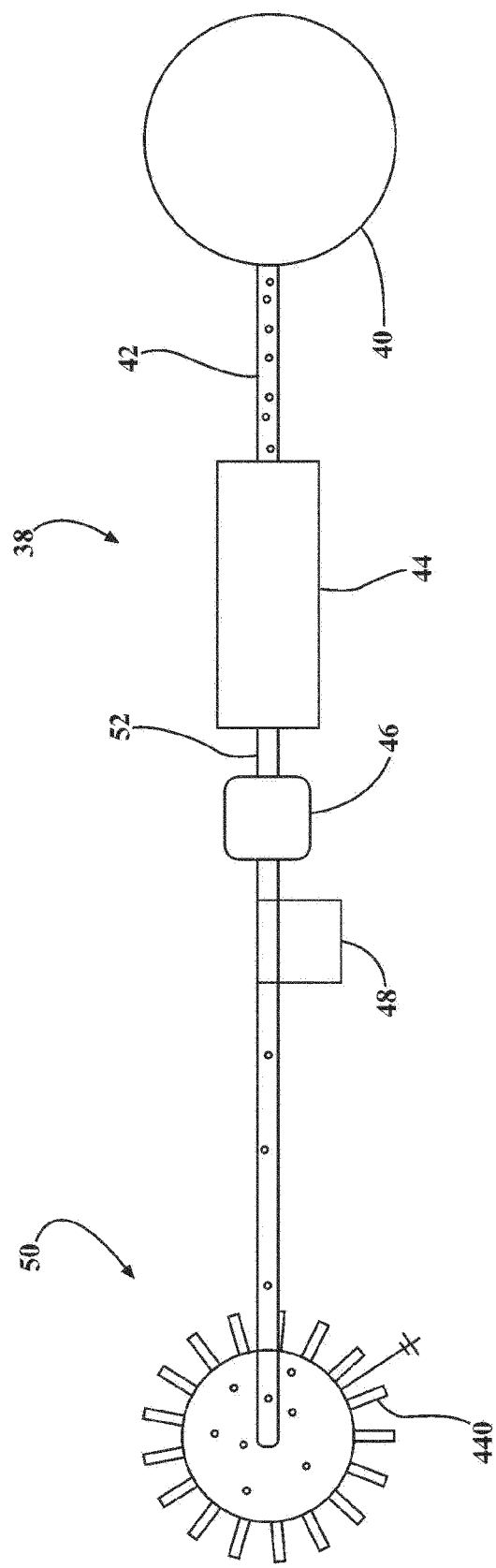
FIG. 20 is a schematic of the anhydrous ammonia fertilizer applicator system including the variable orifice distribution assembly.

The anhydrous ammonia fertilizer distribution system 38 shown schematically in FIG. 20 includes a pressurized supply vessel 40, a heat exchanger 44, flow meter 46, an on and off valve 48 and a variable orifice distributor assembly 50. A supply line 42 carries anhydrous ammonia from the supply vessel 40 to the heat exchanger 44. A continuing supply line 52 carries anhydrous ammonia from the heat exchanger to the variable orifice distributor 50 through the flow meter 46 and the on and off valve 48. The supply vessel 40 is pressurized by the vapor pressure of the anhydrous ammonia at the temperature of the liquid in the vessel. The vapor pressure in the supply vessel is generally between fifty pounds per square inch and one hundred and fifty pounds per square inch depending upon the temperature. At eighty degrees Fahrenheit the vapor pressure is one hundred and thirty eight pounds per square inch. The heat exchanger cools the anhydrous ammonia to a temperature at which the vapor pressure of the anhydrous ammonia entering the variable orifice distributor assembly 50 is below the actual pressure and the liquid anhydrous ammonia is unlikely to change from a liquid to a vapor. The flow meter 46 creates no pressure drop or a very small pressure drop so that vapor is not created. The on and off valve 48 is a ball valve with a liquid passage cross section area that is substantially the same as the liquid passage cross section area of the supply line 42 and the continuing supply line 52. A pressure drop is minimized and turbulence is minimized to reduce the pressure drop. Friction between the flowing liquid and the passage walls of the passages of the supply line 42 and the continuing supply line 52, between the supply vessel 40 and variable orifice distributor apparatus 50 are minimized. However friction and some pressure drop will occur and decrease fluid temperature. The heat exchanger 44 will reduce the creation of anhydrous ammonia vapor and may condense some vapor in the supply line 42, to a liquid.

The anhydrous ammonia entering the variable orifice distributor assembly 50 should contain very little vapor. The pressure drop between the supply vessel 40 and the variable orifice distributor 50 is minimized to reduce the production of liquid vapors. Elimination of a pump and a metering valve between the supply vessel 40 and the variable orifice distribution assembly 50 eliminates two significant vapor producers.

The variable orifice distributor assembly 50 meters anhydrous ammonia and distributes the anhydrous ammonia through a plurality of discharge lines 440. The variable orifice distributor 50 has a cylindrical body 80 with a central axis 82. The body 80 has an inlet end 84, a control end 86 and a cylindrical outer surface 88. The inlet end 84 and the control end 86 are perpendicular to the central axis 82. A central bore 90 through the cylindrical body 80 includes a small diameter bore 92 that is concentric with outer surface 88 and the central axis 82. A large diameter bore 94 is concentric with central axis 82 and extends axially from the control end 86 to the small diameter bore 92. A medium diameter bore 96 is concentric with the central axis 82 and extends axially from the inlet end 84 to the small diameter bore 92. A large ring shaped surface 98, between the small diameter bore 92 and the large diameter bore 94, is perpendicular to the central axis 82 and faces toward the control end 86. A small ring shaped surface 100, between the medium diameter bore 96 and the small diameter bore 92, is perpendicular to the central axis 82 and faces toward the inlet end 84.

A plurality of threaded bores 102, in the body 80, pass through the large ring shaped surface 98. Each threaded bore 102 extends parallel to the central axis 82. A dowel pin bore 104 passes through the large ring shaped surface 98. A plurality of threaded bores 106 extend into the inlet end 84 of the cylindrical body 80 between the cylindrical outer surface 88 and the medium diameter bore 96. Each of the threaded bores 106 extends parallel to the central axis 82.

A gasket recess 108 is provided in the cylindrical body 80 between the small diameter bore 92 and the large ring shaped surface 98. An inlet end gasket recess 110 is provided in the body 80 between the inlet end 84 and the medium diameter bore 96. A mounting groove 112 is provided in cylindrical outer surface 88 of the body 80. The mounting groove 112 extends continuously around the body 80.

Figure 5:
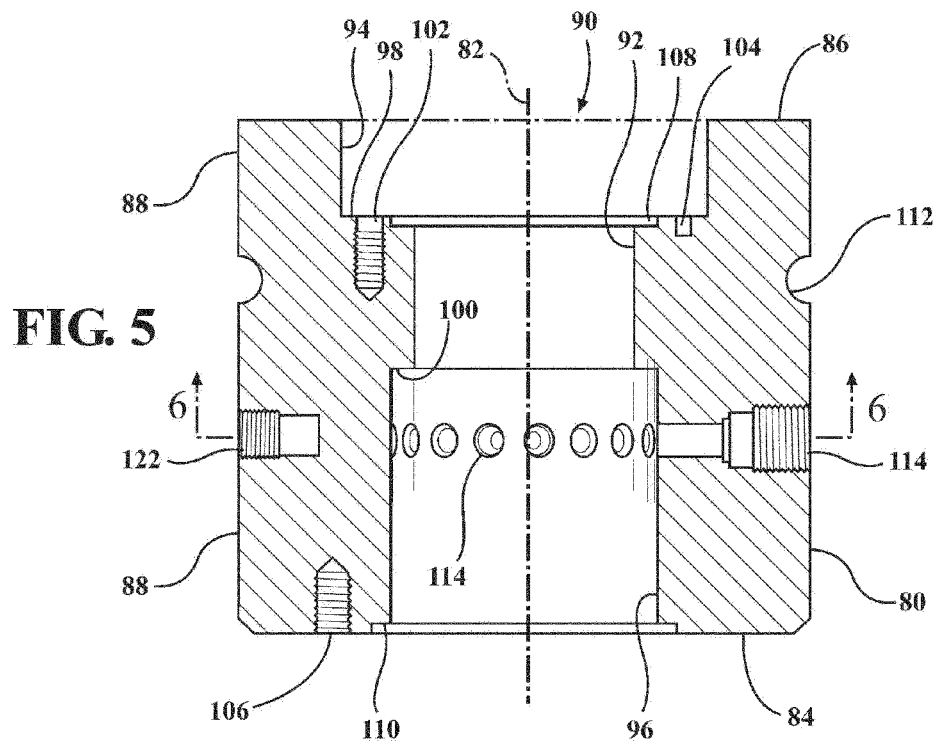
FIG. 5 is a vertical sectional view of a cylindrical body of the variable orifice distribution assembly.
Figure 6:
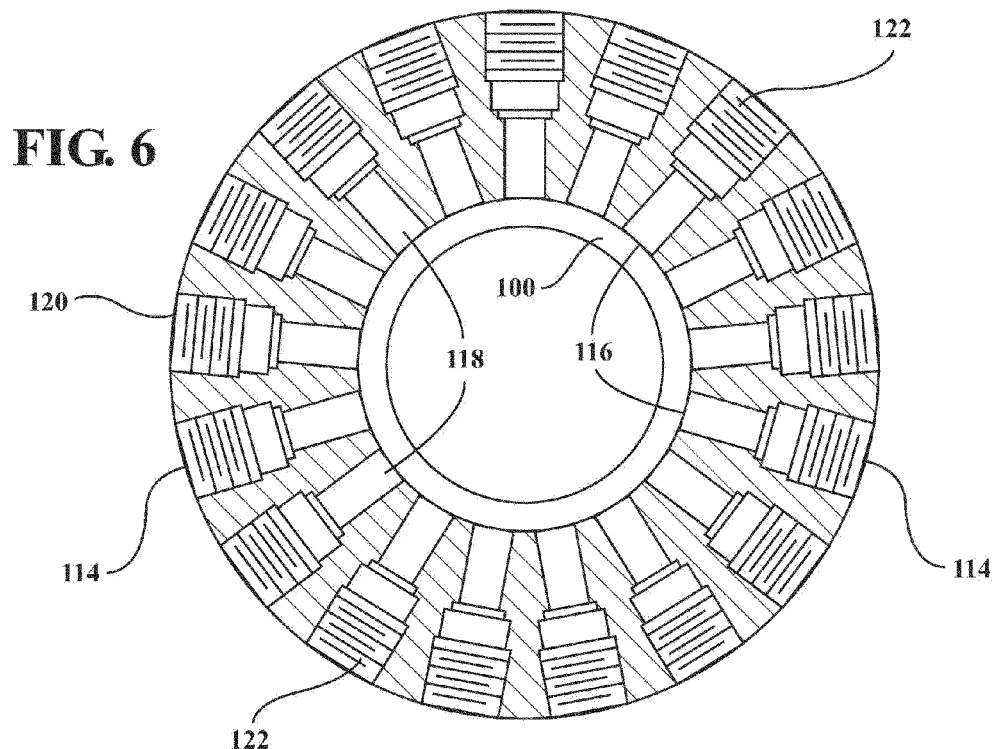
FIG. 6 is a horizontal sectional view of the cylindrical body taken along line 6-6 in FIG. 5.

A plurality of discharge ports 114 extend radially outward from the medium diameter bore 96. Each outlet port 114 has a radially inner portion 116 that is a cylindrical bore 118. The radially outer portion 120 of each outlet port 114 is a threaded bore portion 122. The threaded bore portion 122 has a diameter that is larger than the diameter of the cylindrical bore 118. The cylindrical body 80, as shown in FIG. 5, has seventeen discharge ports 114. The number of discharge ports 114 can be changed. Seventeen ports can fertilize sixteen crop rows. Discharge ports 114 that are not required can be plugged. If more than seventeen discharge ports 114 are required for a large fertilizer applicator, additional variable orifice distributors 50 may be added. Row crop planters that plant eight, sixteen or twenty four rows per pass through a field are employed by farmers. A few large farmers employ planters that plant thirty six rows on each pass through a field. It is possible to make two or more passes through a field to apply anhydrous ammonia to an area planted during one pass by a planter and still have the desired spacing between plant rows and the fertilizer.

Figure 7:
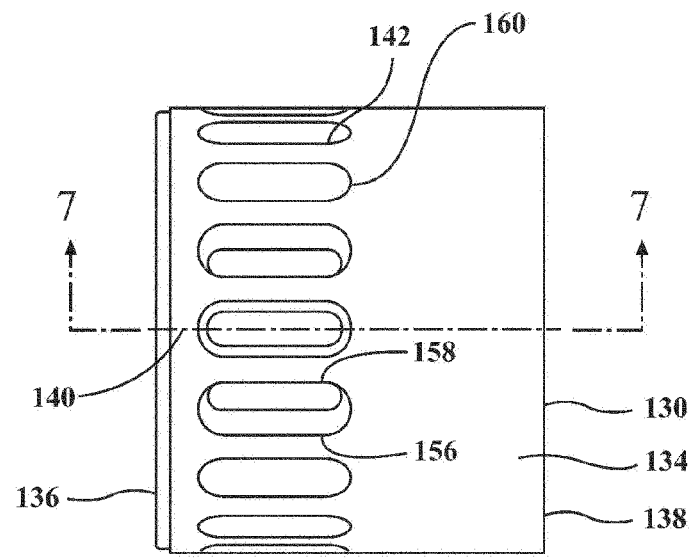
FIG. 7 is an enlarged side view of a fixed distribution cage of the variable orifice distribution assembly.
Figure 8:
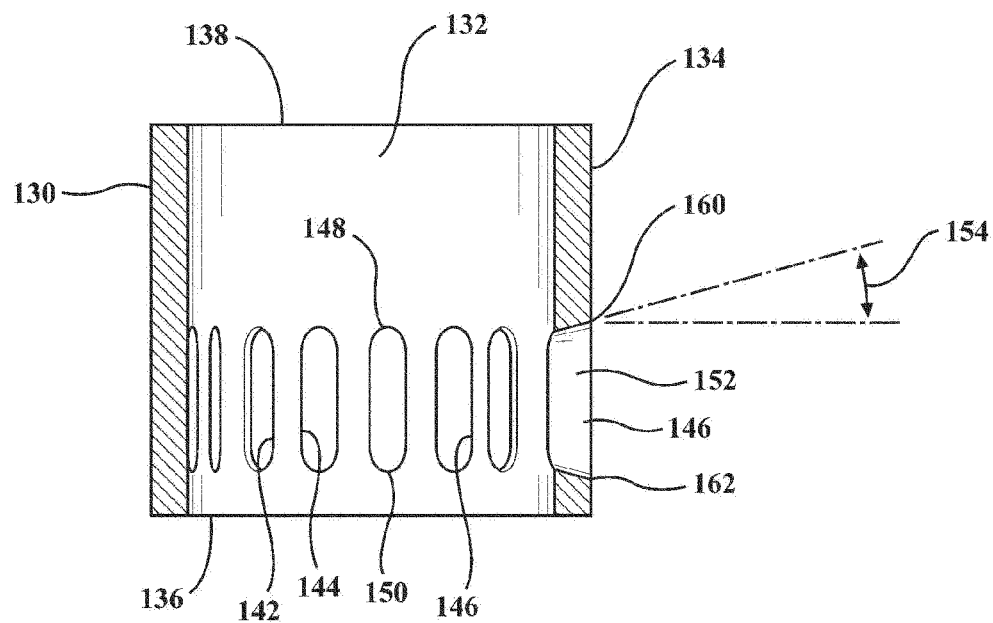
FIG. 8 is a vertical sectional view of the fixed distribution cage taken along line 7-7 in FIG. 7.

A fixed distribution cage 130 is shown in FIGS. 7 and 8. The distribution cage 130 is a tubular member with a cylindrical inside surface 132 and a cylindrical outer surface 134. The cylindrical outer surface 134 has a fixed cage diameter that is slightly larger than the diameter of the medium diameter bore 96 of the cylindrical body 80. The fixed distribution cage 130 includes an anchor end 136 and a free end 138. The fixed distribution cage 130 is pressed into the medium diameter bore 96. A axis 140 of the fixed distribution cage 130 is perpendicular to the anchor end 136 and the free end 138. The axis 140 is also coaxial with the cylindrical inside surface 132 and the cylindrical outer surface 134.

Seventeen axially elongated slots 142 pass through the fixed distribution slot from the cylindrical inside surface 132 to the cylindrical outer surface 134. Each axially elongated slot 142 has a straight first inside edge 144 and a straight second inside edge 146. The straight first inside edge 144 and the straight second inside edge 146 are parallel to the axis 140 of the fixed distribution cage 130. Each elongated slot 142 has an inside arcuate end 148 positioned toward the free end 138 of the fixed distribution cage 130. Each elongated slot 142 also has an inside arcuate end 150 positioned toward the anchor end 136 of the fixed distribution cage 130.

Walls 152 of each axially elongated slot 142 extend radially outward from the inside edges at an angle 154 of fifteen degrees thereby increasing the area of each of the elongated slot from the cylindrical inside surface 132 to the cylindrical outside surface 134. Each axially elongated slot 142 has a straight first outside edge 156 and a straight second outside edge 158. The straight first outside edge 156 and the straight second outside edge 158 are parallel to the axis 140 of the fixed distribution cage 130. Each elongate slot 142 has an outside arcuate end 160 positioned toward the free end 138 of the fixed distribution cage 130. Each elongated slot 142 also has an outside arcuate end 162 positioned toward the anchor end 136 of the fixed distribution cage 130.

The inside arcuate end 148 is spaced from inside arcuate end 150 a distance, parallel to the axis 140, that is one third of the minimum distance from the anchor end 136 to the free end 138 of the fixed distribution cage 130. The outside arcuate end 160 of each axially elongated slot 142 is midway between the anchor end 136 and the free end 138 of the fixed distribution cage 130. There is no fluid passage through the cylindrical inside and outside surfaces 132 and 134 of the fixed distribution cage 130 between the axially elongated slots 142 and the free end 138 of the fixed distribution cage. All anhydrous ammonia that passes through the axially elongated slots 142 is directed out of the cylindrical body 80 through the discharge ports 114. The cylindrical outside surface 134 of the fixed distribution cage 130 cooperates with the walls of the medium diameter bore 96 to prevent leakage between discharge ports 114, when each axially elongated slot 142 is in radial alignment with one of the discharge ports 114.

A piston head 170 has a cylindrical wall 172. The cylindrical wall 172 has an radially outer surface 174 with an outside piston diameter. The outside piston diameter is substantially the same as the diameter of the cylindrical inside surface 132 of the fixed distribution cage 130. A transverse plate 176 is integral with the cylindrical wall 172. An upper skirt 178 extends from the transverse plate 176 to a skirt head end 180. A rod end skirt 182 extends from the transverse plate 176 to a skirt rod end 184. a piston head axis 186, of the piston head 170, is coaxial with the radial outer surface 174. The fixed distribution cage 130 is pressed into the medium diameter bore 96 until the anchor end 136 seats on the small ring shaped surface 100. There is a slight interference fit to insure that the fixed distribution cage 130 does not move relative to the cylindrical body 80 after being clamped in place as explained below.

The upper skirt 178 has seventeen slots 188. Each slot 188 has an elongated first wall 190 and an elongated second wall 192 that are parallel with the piston head axis 186. Each slot 188 has a head end wall 194 that is perpendicular to the piston head axis 186 and spaced from the skirt head end 180. A rod end 196 of each slot 188 is transverse to the piston head axis 186 and in a plane that includes the head end surface 198 of the transverse plate 176. The length of the slots 188 parallel to the piston head axis 186 is substantially the same length as the length of the axially elongated slots 142 through the fixed distribution cage 130. The elongated first wall 190 and the elongated second wall 192 of each slot 188 in piston head 170 are closer together than the first straight inside edge 144 and the second inside edge 146 of axially elongated slot 142. During flow of anhydrous ammonia through the variable orifice distribution assembly 50, a slot 188 is the primary flow restrictor. Liquid and vapor that passes through one slot 188 is restricted to move through the aligned slot 142 and through a line 440 to a knife 388 in communication with the one slot. The rod end skirt portion 182 has no passages through the cylindrical wall 172 between the transverse plate 176 and the skirt rod end 184. The rod end skirt portion 182 has a cylindrical rod end inside surface 208 that is coaxial with the piston head axis 186. A beveled surface 200 extends from the cylindrical rod end inside surface 208 to the skirt rod end 184 and continuously about the piston head axis 186. A cap screw bore 202 passes through the center of the transverse plate 176. Four small diameter bores 204 pass through the transverse plate 176 to equalize pressure on the cylindrical rod end inside surface 208 and the rod side 206 of the transverse plate, with pressure on the head end surface 198 of the transverse plate. A closed end dowel pin bore 210 extends into the transverse plate 176 from the rod side 206.

Figure 17:
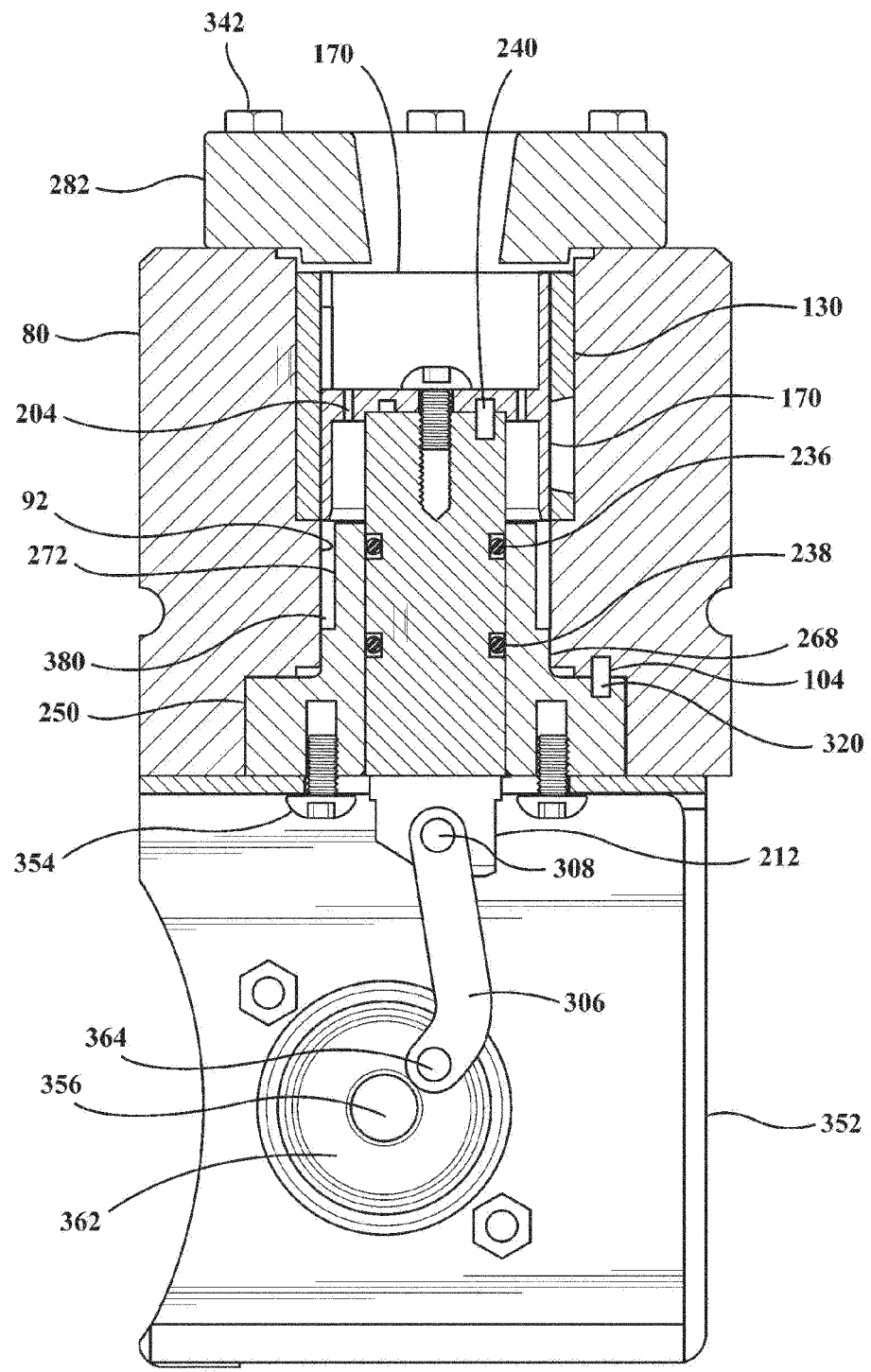
FIG. 17 is a vertical sectional view through the variable orifice distribution assembly and a portion of the connector rod drive assembly.

A piston shaft 212, shown in FIG. 11, is a cylindrical rod with a piston end 214 and a driven end 216. The piston end 214 includes a piston engaging surface 218, a threaded bore 220 and a dowel pin bore 222. The piston end 214 with the piston engaging surface 218 is received in a recess 207 in the transverse plate 176. The cylindrical wall 209 of the recess 207 engage the piston shaft 212 to center the piston head 170 on the piston shaft. The threaded bore 220 is coaxial with the piston shaft 212 and perpendicular to the piston engaging surface 218. The dowel pin bore 222 is radially spaced from the threaded bore 220 and perpendicular to the piston engaging surface 218. A cylindrical bearing surface 224, on this piston shaft 212, extends from the piston engaging surface 218 toward the driven end 216. Two sealing ring grooves 226 and 228 divide the bearing surface 224 into a piston end bearing portion cylindrical surface 230, a center portion bearing cylindrical surface 232 and a remote end bearing portion cylindrical surface 234. Resilient low friction seals 236 and 238, shown in FIG. 17 are mounted in the sealing ring grooves 226 and 228. A dowel pin 240 is mounted in the dowel pin bore 222 in the piston shaft 212 and dowel pin bore 210 in the transverse plate 176 of the piston head 170. A cap screw 242 passes through a lock washer 244, the cap screw bore 202 through the piston head 170 and screws into the threaded bore 220. The cap screw 242 is tightened to secure the piston head 170 to the piston shaft 212 and retain the dowel pin 240 in the dowel pin bore 222 and the dowel pin bore 210.

A control end insert 250, of the variable orifice distributor assembly 50, includes a base 252, a mast 254, and a central bore 256. The central bore 256 has a control end insert axis 258. A base cylindrical outer surface 260 is coaxial with insert axis 258. The diameter of the base outer cylindrical surface 260 is substantially the same diameter as the large diameter bore 94 of the cylindrical body 80. The axially outer surface 262 of the base 252 is transverse to the insert axis 258. An axially inner surface 264 of the base 252 is transverse to the control end insert axis 258 and parallel to the axially outer surface 262. The mast 254 has a mast end surface 266 that is parallel to the axially outer surface 262. A first cylindrical portion 268 of the mast 254, extends axially from the inner surface 264 of the base 252 to a ring shaped surface 270 that is perpendicular to the control end insert axis 258. A second cylindrical portion 272, of the mast 254, extends from the ring shaped surface 270 of the first cylindrical portion 268 to mast end surface 266. The first cylindrical portion 268 has a larger diameter than the diameter of the second cylindrical portion 272. A plurality of space apart bores 276 pass through the base 252 from the axially outer surface 262 and through the axially inner surface 264. Each of the plurality of spaced apart bores 276 includes a counter bore 278 that extends through the outer surface 262 of the base 252. Two closed end threaded bores 280 are provided in the base 252 of the control end insert 250. Both threaded bores 280 pass through the axially outer surface 262 of the base 252.

An inlet end cover 282, of the variable orifice distribution assembly 50, is shown in FIGS. 14 and 15. The inlet end cover 282 has an outside cover surface 284 and an inside cover surface 286. The outside cover surface 284 is a flat surface that is perpendicular to an inlet end cover axis 290. The inside cover surface 286 is parallel to and spaced from the outside cover surface 284. An outer cylindrical surface 288 is concentric with the inlet cover axis 290. A central inside cover surface 292 is transverse to the inlet cover axis 290. The inside cover surface 286 is located axially between the outside cover surface 284 and the central inside cover surface 292. A truncated conical surface 294 extends from the inside cover surface 286 to the central inside cover surface 292. An inlet threaded bore 296 is coaxial with the inlet end cover axis 290. The inlet threaded bore 296 has tapered pipe threads that are commonly employed in liquid fertilizer conveyor systems. A different liquid inlet bore thread could be employed if desired. Six bolt bores 298 are provided through the inlet end cover 282. The bores 298 are spaced an equal distance from the inlet end cover axis 290 and pass through the outside cover surface 284 and the inside cover surface 286. A threaded bore 300 is provided in the inlet end cover 282. The threaded bore 300 is positioned to a side of the inlet threaded bore 296 and extends from the outside cover surface 284 to a bore bottom 302. A small bore 304 passes through the bore bottom 302 and the central inside cover surface 292. A pressure gauge (not shown) may be mounted in the threaded bore 300 if desired. The pressure gauge will indicate the pressure on anhydrous ammonia entering the variable orifice distribution assembly 50. The pressure will let the operator know if there is a blockage to flow upstream or if the supply tank is empty. The pressure will also permit an operator to determine if there is significant gas or vapor in the anhydrous ammonia fertilizer. A plug can close the threaded bore 300 if pressure measurements are not needed.

Figure 18:
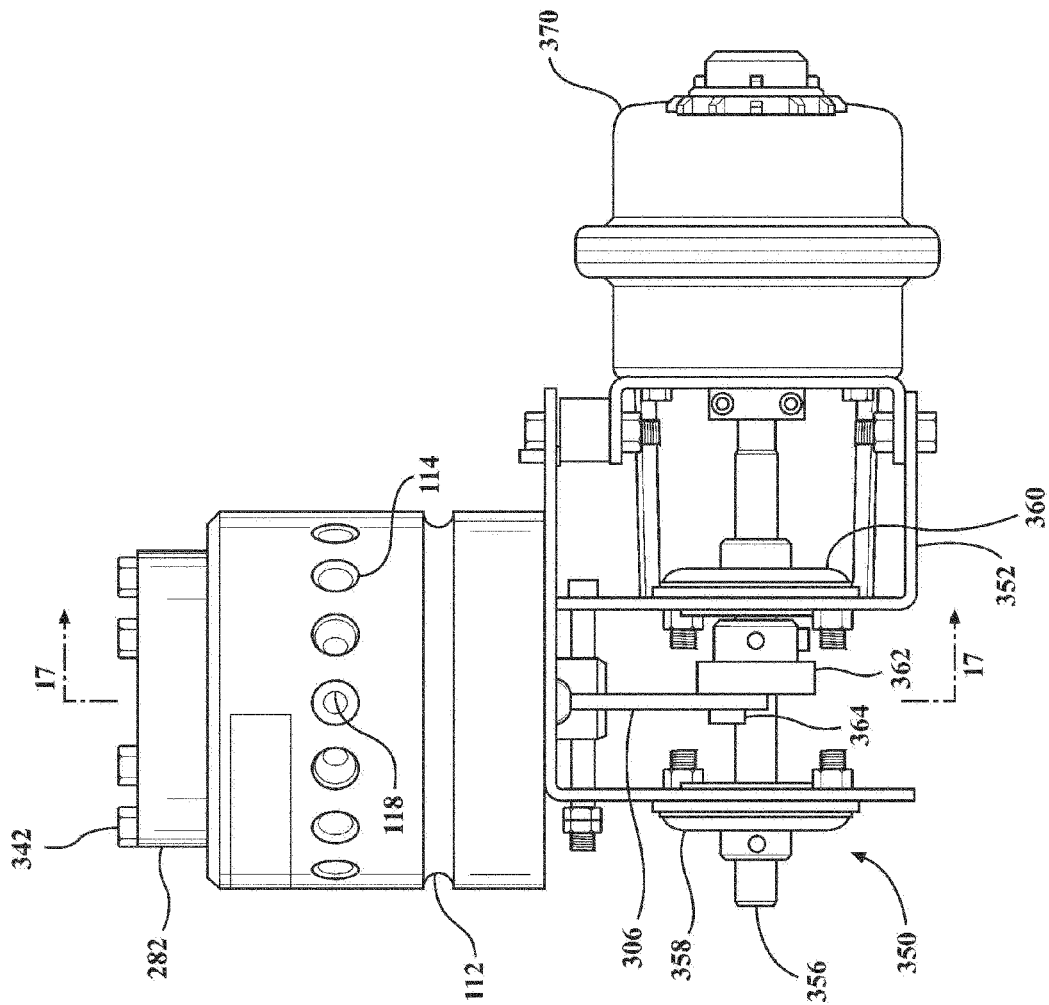
FIG. 18 is an elevational view of the variable orifice distribution assembly the attached connector rod drive assembly and a direct current actuator.
Figure 19:
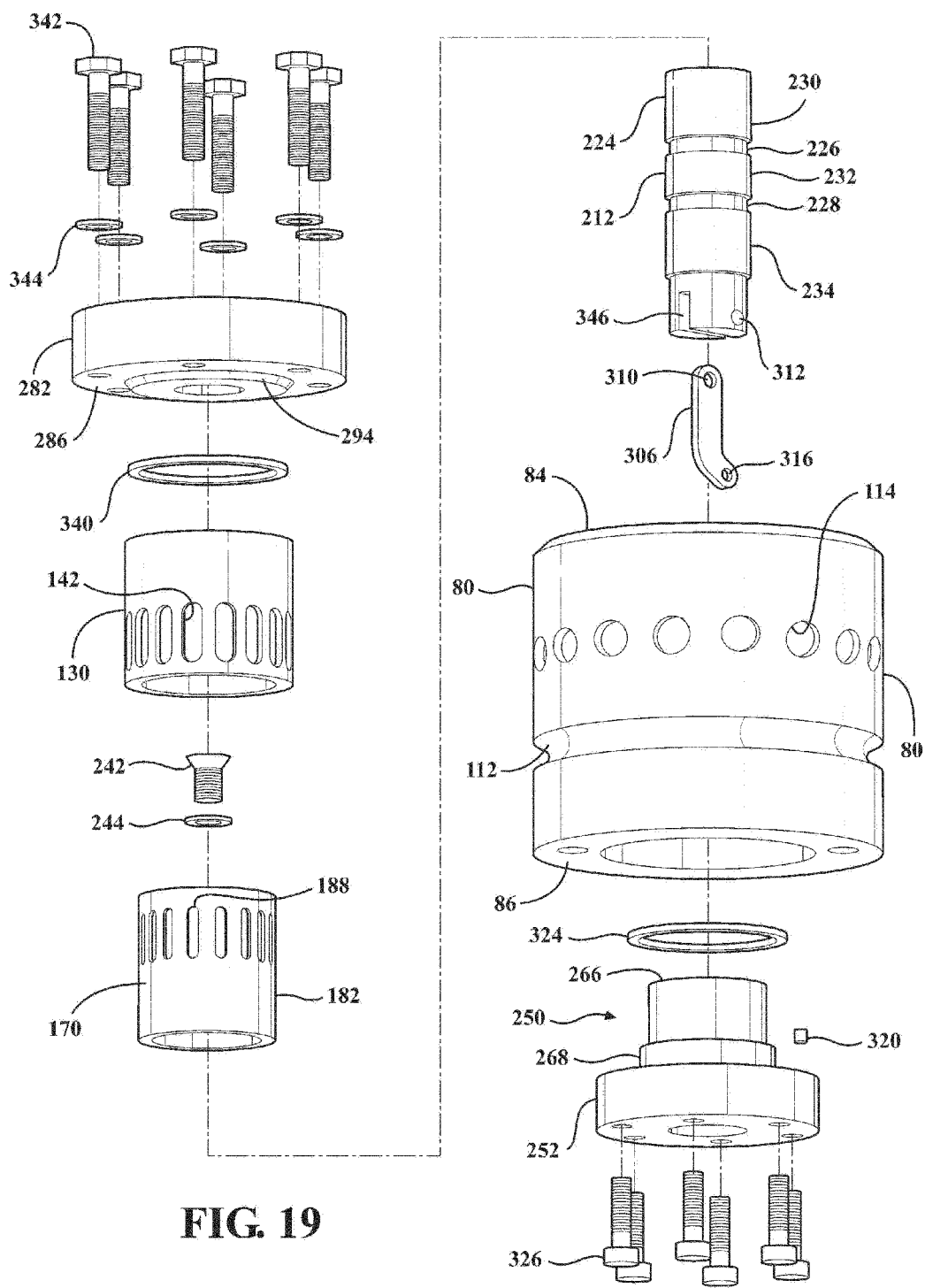
FIG. 19 is an exploded view of the variable orifice distribution assembly.

A connector rod 306, shown in FIGS. 16 and 18 is connected to the piston shaft 212 by a pivot pin 308. The pivot pin 308 passes through a bore 310 through the connecting rod 306 and a bore 312 through the piston shaft 212. An offset 314 in the connector rod 306 moves a second bore 316 to one side of a connector rod portion 318 with the bore 310.

The order of assembly of the variable orifice distribution assembly 50 can be varied somewhat from the order set forth below. However, the final position of most parts is fixed.

The fixed distribution cage 130 is pressed into the medium diameter bore 96 through the inlet end 84 of the cylindrical body 80. Each axially elongated slot 142 is centered on one of the cylindrical bores 118 of a discharge port 114. Alignment of one elongated slot 142 with an adjacent cylindrical bores 118 will align all of the elongated slots with an adjacent cylindrical bore. The fixed distribution cage 130 is pressed into the medium diameter bore 96 until the anchor end 136 of fixed distribution cage engages the small ring shaped surface 100. The press fit of the fixed distribution cage 130 in the cylindrical body 80 creates a seal between each axially elongated slot 142 and the adjacent cylindrical bore 118.

The control end insert 250 has a base 252 that is received in the large diameter bore 94 of the cylindrical body 80. The mast 254, of the control end insert 250, includes a first cylindrical portion 268 that is received in small diameter bore 92 of the cylindrical body 80. The engagement between first cylindrical portion 268 and the small diameter bore 92 holds the control end insert axis 258 coaxial with the central axis 82 of the cylindrical body 80. Engagement, if any, between the base cylindrical outer surface 260 and the large diameter bore 94 may also holds the control end insert axis 258 coaxial with the central axis 82 of the cylindrical body 80. Engagement of the large ring shaped surface 98, of the cylindrical body 80, and the axially inner surface 264 axially positions the control end insert 250 along the central axis 82 of the cylindrical body 80.

A dowel pin 320 received in a dowel pin bore 104 in the cylindrical body 80, and a dowel pin bore 322 fixes the position of the control end insert 250 about the central axis 82. A gasket 324 is received in gasket recess 108 in the cylindrical body 80. Bolts 326 pass through bores 276 through the base 252 and screw into threaded bores 102 in the body 80 to clamp the control end insert 250 to the large ring shaped surface 98. The gasket 324 prevents leakage of fertilizer between the cylindrical body 80 and the control end insert 250.

The piston head 170, and attached piston shaft 212 have a resilient first seal 236 mounted in sealing ring groove 226. A resilient second seal 238 is mounted in sealing ring groove 228. The driven end 216 of the piston shaft 212 is inserted into the central bore 256 from the mast end surface 266. The central bore 256, of the control end insert 250, cooperates with the piston end cylindrical portion bearing surface 230, the central cylindrical portion bearing surface 232, and the remote end cylindrical portion bearing surface 234 of the piston shaft 212 to hold the piston head axis 186 parallel to the control end insert axis 258. All three cylindrical portion bearing surfaces 230, 232 and 234 remain in at least partial engagement with the central bore 256 through the control end insert 250 during operation of the variable orifice distribution assembly 50.

An inlet end gasket 340 is positioned in the inlet end gasket recess 110 in the inlet end 84 of the cylindrical body 80. The truncated conical surface 294 on the inlet end cover 282 centers the cover relative to the medium diameter bore 96. The inlet end gasket 340, in the inlet end gasket recess 110, is engaged by the conical surface 294 and the inside cover surface 286 and seals between the inlet end 84 of the cylindrical body 80 and the inlet end cover 282. Bolts 342 pass through lock washers 344 and bolt bores 298 and screw into threaded bores 106 to clamp the inlet end cover 282 to the cylindrical body 80

The connector rod 306 is inserted into a groove 346 in the driven end 216 of the piston shaft 212. A pivot pin 308 passes through a pin bore 312 through the piston shaft 212 and the bore 310 in the connector rod 306.

Figure 12:
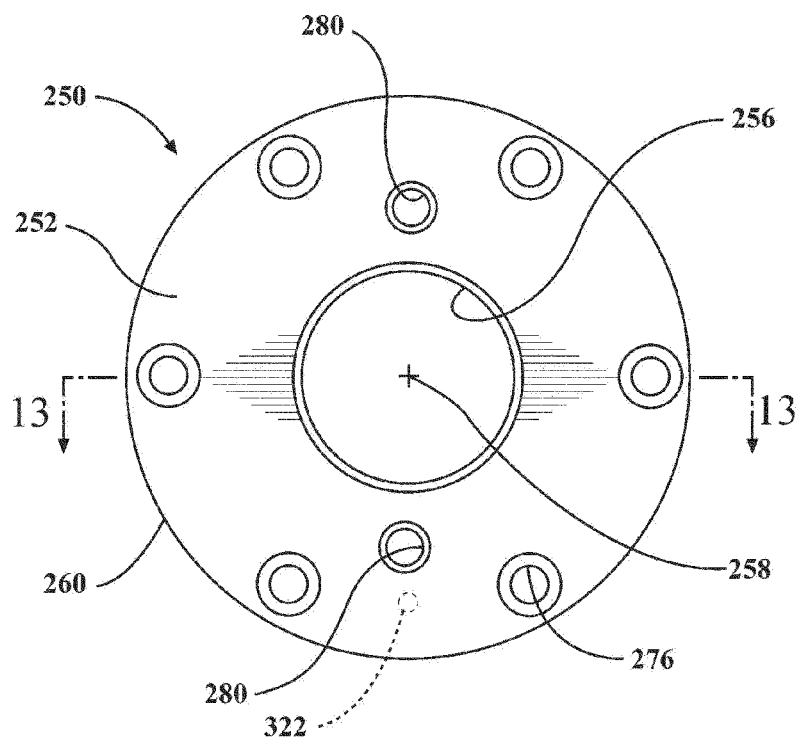
FIG. 12 is a bottom view of a control end insert of the variable orifice distribution assembly.
Figure 13:
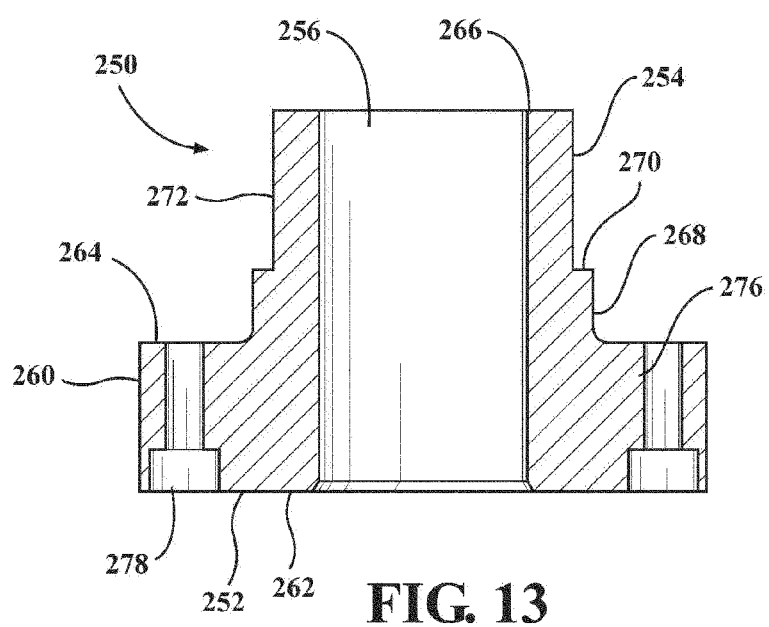
FIG. 13 is a sectional view of the control end insert taken along line 13-13 in FIG. 12.

A connector rod driver assembly 350 shown in FIG. 18, includes a housing 352 clamped to the control end insert 250 by bolts 354 that are received in closed end threaded bores 280 shown in FIG. 12. A crank shaft 356 is journaled in the housing 352 by bearings 358 and 360. A bell crank 362 is fixed to the crank shaft 356. A shoulder screw 364 passes through the second bore 316 in the connector rod 306 and screws into the bell crank 362. Pivotal movement of the crank shaft 356 moves the connector rod 306 and slides the piston shaft 212 in the central bore 256 of the control end insert 250. Movement of the piston shaft 212 results of movement of the piston head 170 in the fixed distribution cage 130 as described below. The connector rod 306 is held by the shoulder screw 364 for pivotal movement about a screw axis parallel to the shaft axis of crank shaft 356. The connector rod 306 prevents pivotal movement of the piston shaft 212 bout the control end insert axis 258 and the central axis 82 of the central bore 90.

A direct current (DC) actuator 370 is connected to the housing 352 and the crank shaft 356 to control the position of the piston head 170 relative to the fixed distribution cage 130.

Linear movement of the piston head 170 to a position close to the central inside cover surface 292 of the inlet end cover 282 moves the piston slots 188, of the piston head 170, and the head end skirt 178 to a position in which the flow of fluid fertilizer such as anhydrous ammonia through the slots 188 is blocked by the cylindrical inside surface 132 of the fixed distribution cage 130 between the free end 138 and the axially elongated slots 142. The cylindrical inside surface 132 of the fixed distribution cage 130 has an inside diameter that is substantially the same as the outside diameter of the head end skirt 178 of the piston head 170. The flow of fluid between the radial outer surface 174 of the piston head 170 and the cylindrical inside surface 132 of the fixed distribution cage 130 is blocked. However, the piston head 170 is permitted to move axially relative to the fixed distribution cage 130 with a minimal force applied by the connector rod 306.

The piston head 170 is shown in a closed position in FIG. 17. Retraction of the piston shaft 212 from the central bore 256 in the control end insert 250 moves the slots 188 in the piston head 170 axially and into alignment with the axially elongated slots 142 and provide the maximum area flow path through each discharge port 114. As the piston shaft 212 is retracted from the closed position adjacent to central inside cover surface 292 of the inlet end cover 282, the rod end skirt portion 182 of the piston head 170 moves into the open space 380 between the small diameter bore 92 in the cylindrical body 80 and the second cylindrical portion 272. A ring shaped surface 270 on the control end insert 250 closes the control end of the open space 380. As the rod end skirt portion 182 moves into a selected position in the open space 380, the second cylindrical portion 272 of the control end insert 250 is positioned inside the cylindrical rod end skirt portion 182. Upon the skirt rod end 184 reaching ring shaped surface 270, the open space 380 is nearly filled. The mast end surface 266 approaches the rod side 206 of the transverse plate 176. The second cylindrical portion 272, of the control end insert 250, substantially fills the space inside the rod end skirt portion 182. Fluid that is displaced as the piston head 170 moves to a position closest to the control end 86 of the cylindrical body 80, passes through the small diameter bores 204 and into the head end skirt 178. All of the anhydrous ammonia or other fluid between the transverse plate 176 and the inlet end cover 282 is moveable toward the slots 188 and out of the cylindrical body 80. There is a minimal quantity of fluid between the rod side 206 at the transverse plate 176 and the control end insert 250. It is desirable to minimize the quantity of fluid that is between the transverse plate 176 and the control end insert 250.

Positioning the piston head 170 in a position in which the slots 188 in the head end skirt 178 are axially positioned along the central axis 82 to be centered on the axially elongated slots 142 in the fixed distribution cage 130 will provide the maximum flow rate of a fluid such as anhydrous ammonia through open discharge ports 114. Maximum fluid flow rate is generally not desired. The piston head 170 and the piston shaft 212 are moved toward the inlet cover 282 to reduce the flow rate of fluid. The closer the piston head end 170 is to the inlet end cover 282 the slower the flow rate. When the rod ends 196 of the slots 188 are closer to the inlet end cover 282 than the inside arcuate ends 148 of the axially elongated slots 142 in the fixed distribution cage 130 the flow of fluid will be blocked.

A tool bar 386 employed to carry knives 388 that cut a slot in soil that receives anhydrous ammonia or other liquid fertilizer can take different forms. The tool bar may be a single bar supported by ground engaging wheels and pulled by a tractor or other suitable vehicle. Such a tool bar may be moveable up or down relative to the wheels to control the depth of penetration of the knives. These tool bars may have foldable wings that reduce the total width for transport on roads.

The tool bar 386 may be the tool bar disclosed in U.S. Pat. No. 5,540,290 to Peterson et al. the disclosure of which is incorporated herein by reference. The tool bar is mountable on a three point hitch of a tractor. The tool bar has a center section attached to the hitch and moveable up and down by the hitch. One or more wings are pivotally attached to each end of the center section. The center section and the wings are transverse to the direction of forward movement of the tractor.

A plurality of row units 400 are clamped to the tool bar 386.

Each row unit 400 has a frame 402 clamped to a tool bar 386. A pair of spaced apart parallel upper links 404 are pivotally attached to the frame 402 by a pivot member 406. A pair of spaced apart parallel lower links 408 are pivotally attached to the frame 402 by a pivot member 410. Trailing ends of the upper links 404 are pivotally attached to a mast assembly 412 by pivot member 414. Trailing ends of the lower links 408 are pivotally attached to the mast assembly 412 by pivot member 416. The pivot members 406, 410, 414 and 416 cooperate with the frame 402, the upper links 404, the lower links 408 and the mast assembly 412 to form a pantographic linkage. The linkage permits up and down movement of the mast assembly 412 relative to the tool bar 386. A shank support bar 418 is pivotally attached to the mast 412. A spring steel bar 420 is clamped to the shank support bar 418 by a pair of U-bolts 422. A knife 388 is secured to the spring steel bar 420.

A pair of gauge wheels 426 and 428 are journaled on arms 430 and control the depth of penetration of the knife 424 by following the surface of the ground and moving the mast 412 up and down relative to the tool bar 386. A disk coulter 432 is supported by the mast 412, positioned between the gauge wheels 426 and 428 and rotates about a transverse horizontal axis. The disk coulter 432 severs old crop material forward of the knife 388.

A depth control linkage assembly 434 adjusts the position of the position of the gauge wheels 426 and 428 relative to the mast assembly 412. An adjustable down pressure spring assembly 436 transfers weight from the tool bar 386 to the disk coulter 432 and the knife 388 when required by ground conditions. A spring adjustment assembly 442 adjust the down pressure exerted on the mast 412 by the springs 436. A spring trip assembly 438 permits the support bar 418 and the knife 388 to pivot upward and rearward when the knife 388 contacts an obstruction. U.S. Pat. No. 5,529,128 to Peterson et al., which is incorporated herein by reference, describes the depth control linkage assembly 434, the adjustable down pressure spring assembly, and the spring trip assembly 438 in detail. The number of row units 400 and the spacing between row units can be adjusted as desired. Each knife 388 is connected to a discharge port 114 of the variable orifice discharge assembly 50 by a fertilizer line 440.

A fertilizer tank and trailer hitch assembly 450 is clamped to the tool bar 386 and extends rearward from the tool bar. The variable orifice discharge assembly 50 may be mounted on the hitch assembly 450, of the tool bar 386.

I claim:

1. An anhydrous ammonia fertilizer distribution system comprising;

a pressurized supply vessel, a heat exchanger mounted on a tool bar, a supply line connected to the pressurized supply vessel and the heat exchanger inlet, a variable orifice distribution assembly mounted on the tool bar, a continuing supply line connected to the heat exchanger and the variable orifice distribution assembly and supplying anhydrous ammonia to the variable orifice distribution assembly pressurized entirely by ammonia vapor pressure in the pressurized supply vessel, an on and off valve in the continuing supply line, a flow meter in the continuing supply line, a plurality of knives for opening slots in the ground mounted on the tool bar, a plurality of fertilizer lines each of which is connected to one of the plurality of knives and to the variable orifice distribution assembly;

wherein the variable orifice distribution assembly includes a body having a central bore with a central axis, an inlet end, a control end, a small diameter bore coaxial with the central axis, a medium diameter bore coaxial with the central axis extending from the inlet end to the small diameter bore, a small ring shaped surface perpendicular to the central axis and extending radially from the small diameter bore to the medium diameter bore, a plurality of discharge ports each of which extends radially outward from the medium diameter bore to one of the plurality of fertilizer lines;

a fixed distribution cage with a cage cylindrical inside surface, a cage cylindrical outside surface, an anchor end, a free end, a plurality of axially elongated cage slots passing radially through the fixed distribution cage, the fixed distribution cage press fit in the medium diameter bore, the anchor end in engagement with the small ring shaped surface, each of the plurality of axially elongated cage slots aligned with one of the plurality of discharge ports and a seal formed between the cylindrical outside surface of the fixed distribution cage and the medium diameter bore between each of the plurality of discharge ports;

a piston head including a cylindrical wall with a radially outer surface, an integral transverse plate inside the cylindrical wall and dividing the cylindrical wall into a head end skirt with a head end and a rod end skirt with a skirt rod end coaxial with a piston head axis, a plurality of axially elongated piston slots that are parallel with the piston head axis and pass radially through the head end skirt between the transverse plate and the head end, and at least one bore through the transverse plate for equalizing fluid pressure on the piston head;

a piston shaft with a piston end connected to the transverse plate in the rod end skirt, a driven end, a cylindrical bearing surface and a connector rod pivotally connected to the driven end;

a control end insert having a base end clamped to the control end of the body, a mast first cylindrical portion received in the small diameter bore of the body, a mast second cylindrical portion with an outside diameter that is smaller than the small diameter bore, a mast ring shaped surface between the mast first cylindrical portion and the mast second cylindrical portion, a mast end surface and a mast central bore;

the piston shaft extending from the transverse plate of the piston head, passing through the mast central bore and a seal sealing between the piston shaft and the mast central bore;

an inlet end cover clamped to the inlet end of the cylindrical body and having an inlet threaded bore connected to the continuing supply line; and an actuator connected to the connector rod through a connecting rod drive assembly to move the piston head relative to the fixed distribution cage to a position in which anhydrous ammonia flow through the plurality of axially elongated piston slots is blocked, and to positions that control anhydrous ammonia flow rate, and wherein each of the plurality of axially elongated piston slots meters anhydrous ammonia fertilizer into the portion of an adjacent one of the plurality of axially elongated cage slots that is in communication with the axially elongated piston slot; and an inlet end seal between the inlet end cover and the body of the variable orifice distribution assembly and a control end seal between the control end insert and the body of the variable orifice distribution assembly.

2. An anhydrous ammonia fertilizer distribution system comprising;

a pressurized supply vessel, a heat exchanger mounted on a tool bar, a supply line connected to the pressurized supply vessel and the heat exchanger, a variable orifice distribution assembly mounted on the tool bar, a continuing supply line connected to the heat exchanger and the variable orifice distribution assembly and supplying anhydrous ammonia to the variable orifice distribution assembly pressurized entirely by ammonia vapor pressure in the pressurized supply vessel, an on and off valve in the continuing supply line, a flow meter in the continuing supply line, a plurality of knives for opening slots in the ground mounted on the tool bar, a plurality of fertilizer lines each of which is connected to one of the plurality of knives and to the variable orifice distribution assembly;

wherein the variable orifice distribution assembly includes a body having a central bore with a central axis, an inlet end, a control end, a small diameter bore coaxial with the central axis, a medium diameter bore coaxial with the central axis and extending from the inlet end to the small diameter bore, a large diameter bore coaxial with the central axis and extending from the control end to the small diameter bore, a small ring shaped surface perpendicular to the central axis and extending radially from the small diameter bore to the medium diameter bore, a large ring shaped surface perpendicular to the central axis and extending radially from the small diameter bore to the large diameter bore, a plurality of discharge ports each of which extends radially outward from the medium diameter bore to one of the plurality of fertilizer lines;

a fixed distribution cage with a cage cylindrical inside surface, a cage cylindrical outside surface, an anchor end, a free end, a plurality of axially elongated cage slots passing radially through the fixed distribution cage, the fixed distribution cage pressed into the medium diameter bore, the anchor end in engagement with the small ring shaped surface, each of the plurality of axially elongated cage slots aligned with one of the plurality of discharge ports and a seal formed between cylindrical outside surface of the fixed distribution cage and the medium diameter bore between each of the plurality of discharge ports;

a piston head including a cylindrical wall with a radially outer surface, a transverse plate inside the cylindrical wall and dividing the cylindrical wall into a head end skirt with a head end and a rod end skirt with a skirt rod end coaxial with a piston head axis, a plurality of axially elongated piston slots that are parallel with the piston head axis and pass radially through the head end skirt between the transverse plate and the head end, and at least one bore through the transverse plate for equalizing fluid pressure on the piston head;

a piston shaft with a piston end connected to the transverse plate in the rod end skirt, a driven end and a cylindrical bearing surface, a first sealing ring groove in the cylindrical bearing surface and a second sealing ring groove in the cylindrical bearing surface and dividing the cylindrical bearing surface into a piston end bearing portion surface, a center portion bearing surface and a control end bearing portion surface, a head end resilient low friction seal mounted in the first sealing ring groove and a control end resilient low friction seal mounted in the second sealing ring groove, and a connector rod pivotally connected to the driven end;

a control end insert having a base end received in the large diameter bore and clamped to the large ring shaped surface, a mast first cylindrical portion received in the small diameter bore of the body, a mast second cylindrical portion with an outside diameter that is smaller than the small diameter bore, a mast ring shaped surface between the mast first cylindrical portion and the mast second cylindrical portion, a mast end surface and a mast central bore;

the piston shaft extending from the transverse plate of the piston head, passing through the mast central bore and holding the head end resilient low friction seal and the control end resilient low friction seal in sliding engagement with the mast central bore and the piston shaft holding the radially outer surface of the piston head in sliding and sealing engagement with the cage cylindrical inside surface of the fixed distribution cage;

an inlet end cover clamped to the inlet end of the cylindrical body and having an inlet threaded bore connected to the continuing supply line; and an electric actuator connected to the connector rod through a connecting rod drive assembly to move the piston head relative to the fixed distribution cage to a position in which anhydrous ammonia flow through the plurality of axially elongated piston slots is blocked, to a position in which maximum anhydrous ammonia flow through the plurality of axially elongated piston slots and the plurality of axially elongated cage slots occurs, and to hold the piston head relative to the fixed distribution cage in a selected position which provides a selected flow rate through the variable orifice distribution assembly and wherein the each of the plurality of axially elongated piston slots meter anhydrous ammonia fertilizer into the portion of an adjacent one of the plurality of axially elongated cage slots that is in communication with the axially elongated piston slot.

3. An anhydrous ammonia fertilizer distribution system, as set forth in claim 2, wherein the each of the plurality of axially elongated piston slots has a piston slot length from a slot head end to a slot rod end that is substantially the same as a cage slot length from a first inside arcuate end to a second inside arcuate end.

4. An anhydrous ammonia fertilizer distribution system, as set forth in claim 2, wherein each axially elongated piston slot has a piston slot width transverse to the piston head axis from an elongated first wall to an elongated second wall that is less than a cage slot width transverse to a cage axis from a first straight inside edge to a second straight inside edge.

5. An anhydrous ammonia fertilizer distribution system, as set forth in claim 2, wherein each of the axially elongated cage slots in the fixed distribution cage increases in size from the cage cylindrical inside surface to the cage cylindrical outside surface.

6. An anhydrous ammonia fertilizer distribution system, as set forth in claim 2, wherein the transverse plate of the piston head includes a recess that receives a piston engaging surface of the piston shaft.

* * * * *